United States Patent
Thomas et al.

(10) Patent No.: US 11,503,104 B1
(45) Date of Patent: Nov. 15, 2022

(54) IMPLEMENTING A QUEUING SYSTEM IN A DISTRIBUTED NETWORK

(71) Applicant: CLOUDFLARE, INC., San Francisco, CA (US)

(72) Inventors: George Thomas, Oakland, CA (US); Dimitrios Antonellis, San Mateo, CA (US); Mathew Jacob, Austin, TX (US); Fabienne Heitiare Semeria, Redwood City, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 17/341,271

(22) Filed: Jun. 7, 2021

(51) Int. Cl.
*G06F 15/16* (2006.01)
*H04L 67/02* (2022.01)
*H04L 47/56* (2022.01)
*H04L 67/146* (2022.01)
*H04L 67/01* (2022.01)

(52) U.S. Cl.
CPC ............ *H04L 67/02* (2013.01); *H04L 47/562* (2013.01); *H04L 67/01* (2022.05); *H04L 67/146* (2013.01)

(58) Field of Classification Search
CPC ....... H04L 67/02; H04L 67/01; H04L 47/562; H04L 67/146
USPC ........................................................ 709/203
See application file for complete search history.

(56) References Cited

U.S. PATENT DOCUMENTS

| | | | |
|---|---|---|---|
| 8,015,327 B1* | 9/2011 | Zahavi | G06F 11/3476 710/52 |
| 8,504,691 B1* | 8/2013 | Tobler | H04L 67/60 709/224 |
| 2014/0052835 A1* | 2/2014 | Felton | G06F 16/958 709/223 |
| 2017/0346948 A1* | 11/2017 | Wolf | H04M 3/5238 |

* cited by examiner

*Primary Examiner* — Alan S Chou
(74) *Attorney, Agent, or Firm* — Nicholson De Vos Webster & Elliott LLP (57) ABSTRACT

A web application has a limit on the total number of concurrent users. As requests from client devices are received from users, a determination is made whether the application can accept those users. When the threshold number of users has been exceeded, new users are prevented from accessing the web application and are assigned to a queue system. A webpage may be sent to the users indicating queue status and may provide their estimated wait time. A cookie may be sent to the client for tracking the position of the user in the application queue. The users are assigned to a user bucket associated with a time interval of their initial request. When user slots become available, the users queued in the user bucket (starting from the oldest user bucket) are allowed access to the web application.

17 Claims, 4 Drawing Sheets

IMPLEMENTING A QUEUING SYSTEM IN A DISTRIBUTED NETWORK

FIELD

Embodiments of the invention relate to the field of network communications, and more specifically, to implementing an application queuing system in a distributed network

BACKGROUND

Hosts are concerned with maintaining high security, performance, and reliability of their hosted resources, such as applications and web resources (e.g., websites). Network traffic related to resources can include requests to access, retrieve, and/or modify resources hosted by an origin server. As the popularity of a resource increases, so does the amount of network traffic that is directed to the origin server hosting the resource. Heavy traffic can affect the security, performance, and reliability of a resource. For example, requests in excess of what the origin server can process may result in requests timing out or being dropped, resulting in poor server performance and user experience.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Origin servers host resources that are accessible by various client devices. Requests for those resources may be received and processed at intermediary proxy servers such as those providing content delivery network (CDN) or other performance and/or security services. For instance, edge servers of a distributed cloud computing network may receive and process requests for the origin resources instead of the origin servers. In such situations, an edge server can either respond to the request using a stored version from a cache, or the edge server can forward the request so that the request can be served from the origin server. When the origin server experiences periods of high request volume more than the amount the infrastructure supporting the origin server can handle, the infrastructure supporting the origin server can fail.

Some conventional solutions to prevent an origin server from being overwhelmed with requests use filters to filter out some traffic, or to rate limit the amount of traffic that can reach the origin server. These solutions can result in dropped or lost requests, affecting the reliability and availability of requested resources.

Another conventional solution is to implement a queue that can prevent a web application or resource from being overwhelmed with requests. One type of queue uses a first in, first out (FIFO) scheme, where each request is queued in the order they are received and once requests can be sent to the destination, extract the requests in the same order they were received. One drawback of FIFO is that each request must be individually tracked to enable the extraction of the requests in the correct order. For example, these solutions typically store the time of arrival of requests and/or assign each request a particular position in the queue. In implementations where there are many queued requests and/or a large number of queues, tracking each request (e.g., by storing information indicating their time of arrival or their position) can become resource intensive.

The embodiments described herein provide mechanisms for mitigating heavy request traffic directed to a web application or resource by offloading some of those users making requests into a queue system. The web application or resource can have a limit on the total number of users that can be concurrently interacting with the application or resource. When the queue system is enabled, as requests from client devices are received from users, receiving edge servers can determine whether the application can accept those users. For example, the edge server determines whether the number of users exceeds a threshold number of users that can be accepted for the web application or resource. When the threshold number of users has been exceeded, the edge servers block the sending of new requests to the application and instead assign those users to the queue system. A page may be sent to the user that indicates the user is in an application queue and may provide their estimated wait time. A cookie may be sent to the client for tracking the position of the user in the application queue. The page may be configured to automatically refresh until the user is admitted to the application. Each edge server can manage separate queues and users can be assigned to a user bucket associated with a time interval, where the arrival time of the request at the edge server from a user is within the time interval of the user bucket. For example, if a user bucket is for requests received from 12:00:01 P.M. and 12:01:00 P.M., any users associated with requests that arrive during that time interval are assigned to the user bucket. Users associated with requests received within the next minute are assigned to a next user bucket, and so on. When user slots become available, the users queued in the user bucket (starting from the oldest user bucket) are allowed access to the web application.

Embodiments of the invention provide many technical advantages, in addition to addressing the deficiencies of previous solutions. For example, improvements to the processing of requests for resources hosted by an origin server can be realized by offloading users associated with requests in excess of an amount that an origin server can handle or chooses to handle to a queue. Preventing the origin server from being inundated with more requests than it can handle at a given time ensures the reliability, stability, and availability of the resource.

Additionally, implementing the edge server queues using user buckets associated with specific time intervals requires or utilizes fewer memory resources. For example, placing each user into a user bucket for users received within a particular time interval (e.g., one minute) eliminates the need to individually store information of the time of arrival of each user that would typically be required to maintain an ordered queue. Further, when requests can be sent to the origin server, the edge server can randomly select users from the user bucket instead of using a selection method that requires the storage and access of stored information for each user.

Figure 1:
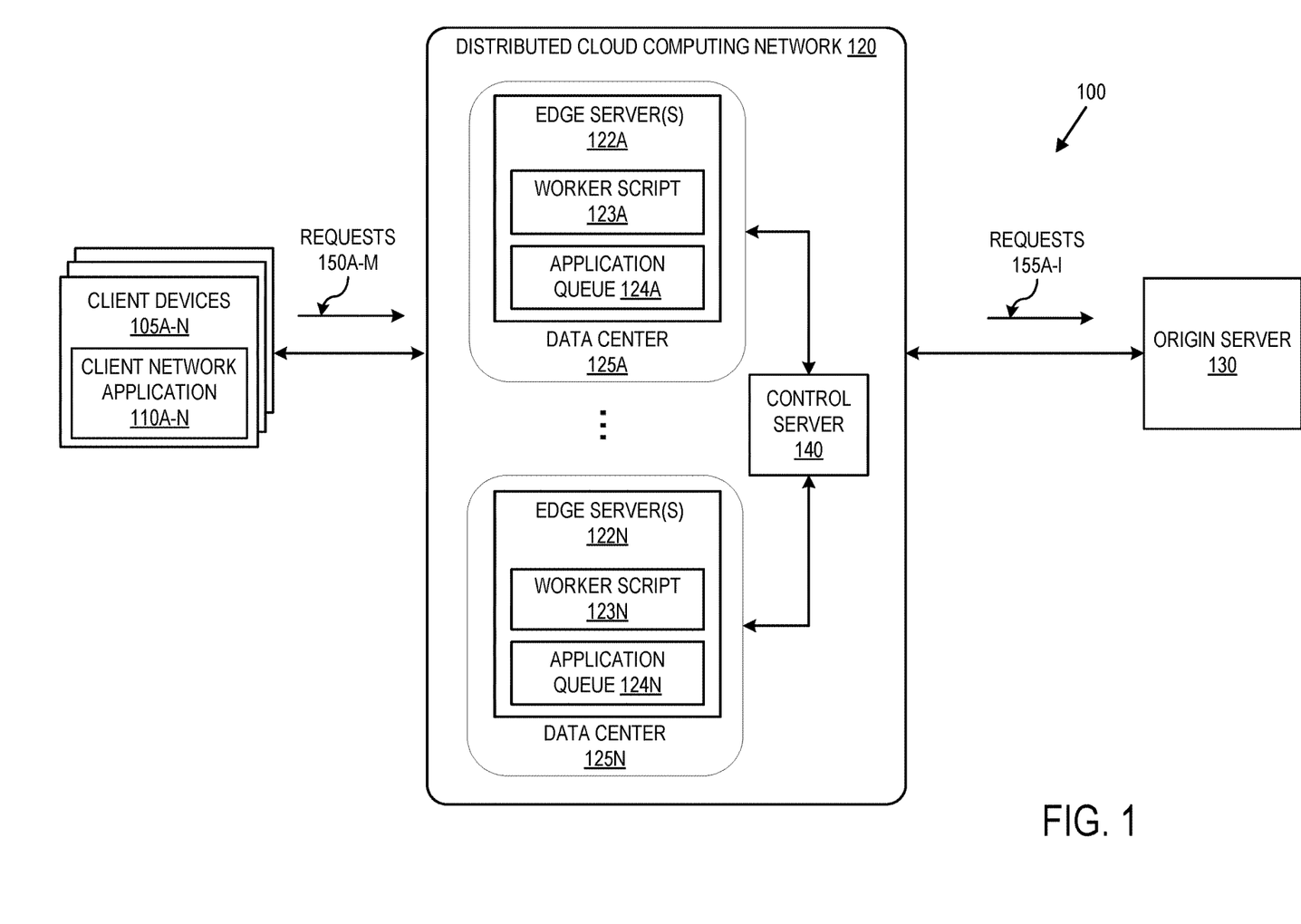
FIG. 1 illustrates an exemplary networked system according to some embodiments described herein.

FIG. 1 illustrates an exemplary networked system 100 according to some embodiments described herein. The exemplary networked system 100 illustrated in FIG. 1 includes a distributed cloud computing network 120 situated between client devices 105A-N and an origin server 130. Distributed cloud computing network 120 includes data centers 125A-N that are geographically distributed. Data centers 125A-N can include one or more edge servers. Each data center can also include one or more DNS servers (e.g., one or more authoritative name servers, one or more proxy DNS servers), and/or one or more other pieces of network equipment such as router(s), switch(es), and/or hubs. In an embodiment, each edge server within a data center may process network layer traffic (e.g., HTTP/S, SPDY, FTP, TCP, UDP, IPSec, SIP, other IP protocol traffic, or other network layer traffic). Distributed cloud computing network 120 also includes the control server 140.

In some embodiments, each edge server of a data center includes a worker script that is associated with a queue for limiting access to an application or resource, sometimes referred herein as an "application queue." Thus, the edge server(s) 122A-N include the worker script 123A-N and are associated with application queues 124A-N, respectively. An application queue represents a virtual queue that limits access to an application or resource. State representing the number of users admitted to the application or resource and the number of users waiting to be admitted is stored for each application queue.

In an embodiment, the data for an application queue is separated into a unit called an object and that object is owned by a single instantiation of a piece of code that can read and/or modify the object while the single piece of code is executing. Other entities that wish to read and/or modify the object communicate with the single instantiation of the piece of code that owns the object. As sometimes used herein, a durable object includes a combination of the single instantiation of a piece of code and the object that belongs to the single instantiation of the piece of code. Thus, in such an embodiment, a global durable object instance is created per application queue.

Traffic destined for the application or resource, which is handled by the origin server 130. is received at the distributed cloud computing network 120. For example, the domain of the application or resource may resolve to IP address(es) of the distributed cloud computing network 120 (which may be anycast IP address(es)). The particular data center that receives a particular IP packet from a client device may be determined by the network infrastructure according to an Anycast implementation or by a geographical load balancer. For instance, the data centers 125A-N may each advertise the same anycast IP address for the origin. An IP packet with a destination IP address of that anycast IP address will be received at the data center that is closest to the client device in terms of routing protocol configuration (e.g., Border Gateway Protocol (BGP) configuration) according to an anycast implementation as determined by the network infrastructure (e.g., router(s), switch(es), and/or other network equipment) between the requesting client device and the data centers.

Examples of client devices 105A-N include computing devices (e.g., laptops, workstations, smartphones, palm tops, mobile phones, tablets, gaming systems, set top boxes, wearable devices, electronic devices, etc.) that are capable of transmitting and/or receiving network traffic. In one embodiment, each of client devices 105A-N executes a client network application 110A-N that is capable of transmitting and/or receiving network traffic. For example, the client network application 110A-N may be a web browser or other application that can send requests to access and display network resources (e.g., web pages, images, word processing documents, PDF files, movie files, music files, or other computer files) hosted by the origin server 130.

The worker script 123A-N can include code deployed to the corresponding edge servers 122A-N. The code can, for example, intercept and answer HTTP requests and make outgoing HTTP sub-requests as part of answering an HTTP request. For purposes of this description, each piece of code is referred to as a worker script and an executed instance of the worker script is referred to as a worker. In some embodiments, each request for a resource hosted at a particular domain (e.g., a domain that corresponds with the application or resource that is protected by the queueing system) that triggers handling of a worker script will be handed by the worker at the edge server that is closest to the requesting client device. For instance, when responding to a request in San Francisco, a worker script is run in an edge server that is closest to the requesting client device. The edge server that receives the request may be determined by the network infrastructure according to an Anycast implementation or by a geographical load balancer.

In some embodiment, each worker is configured to send state information for its corresponding edge server to each of the other edge servers. For example, a worker generated by worker script 123A can send state information for edge server 122A to all other edge servers in distributed cloud computing network 120. The worker for edge server 122A can also receive state information from each of the other edge servers in distributed cloud computing network 120. In other embodiments, the workers additionally, or alternatively, send the state information for their corresponding edge servers to control server 140.

Each of the application queues 124A-N can include one or more user buckets, where each user bucket corresponds to a specific time interval (e.g., 30 seconds, one minute, etc.). In some embodiments, the user buckets correspond to sequential time intervals. Data representing users associated with requests are assigned to user buckets based on the times of arrival of user requests at an edge server being within the specific time interval corresponding to the user bucket. For instance, if the bucket time interval is one minute, all users who first visited the application between 19:51:00 and 19:51:59 are each assigned to the same bucket (e.g., bucket identified by 19:51:00).

Examples of an origin server 130 include computing devices that may serve and/or generate network resources (e.g., web pages, images, word processing documents, PDF files, movie files, music files, or other computer files). Origin server 130 may also be another edge server to the server that serves and/or generates network resources. Although not illustrated in FIG. 1, the network resources of origin server 130 may be stored separately from the device that responds to the requests. Origin server 130 may handle multiple domains that resolve to edge server(s) 122A-N.

In some embodiments, when client devices 105A-N generate requests 150A-M directed to the origin server 130, the requests 150A-M are directed to or received by edge servers 122A-N of the data centers 125A-N. In some embodiments, a geographical load balancer routes traffic to the nearest data center. When a request is received at an edge server, the receiving edge server determines whether the request can be sent to the origin server 130 or whether the request cannot be sent to the origin server 130 and the user should be assigned to an application queue. In some embodiments, the receiving edge server determines whether to assign the user to the application queue based on information from the origin server 130 and/or the control server 140. For instance, a domain owner or operator can configure an application queue including configuring the total number of active user sessions allowed (e.g., a target maximum number), a value of new user sessions per minute, and/or the amount of time in which a user session is valid. Each data center and/or edge server may have their own limit of active user sessions allowed where the sum of those limits is less than or equal to the total number of active user sessions allowed.

A receiving edge server may determine that the user should be queued upon receiving a request for the application or resource. For instance, the edge server may determine whether the request includes a cookie that indicates that the user is allowed to access the application or resource without being queued. If the request does not include a cookie that indicates that the user is allowed to access the application or resource (e.g., the request does not include a cookie, or the cookie does not indicate that the user is allowed to access the application or resource), the edge server accesses a data structure that indicates the current number of active user sessions, the number of user sessions queued in each user bucket, and the number of slots (if any) available. If there is not an available slot, the user session may be added to the queuing system and the receiving edge server may respond to the request with a page that indicates the user is in an application queue and may provide their estimated wait time. The receiving edge server may also set and transmit a cookie to the client, sometimes referred herein as an application queue cookie. The application queue cookie is used for tracking the position of the user in the application queue that allows the network to admit users in a correct order. The application queue cookie may be used for monitoring the duration of each user in the application to provide an accurate estimated time to users queuing in the application queue. The application queue may allow reentry for a period of time (which may be customizable by the operator or owner of the application) without having to be re-queued. The page may be configured to automatically refresh (and submit the application queue cookie) until the user is admitted into the application.

In some embodiments, the application queue cookie can be encrypted so that it cannot be altered once generated. The cookie can include information identifying the requesting client device, including but not limited to a device identifier and an IP address. In some embodiments, the device identifier and IP address can be used to verify that the request is from the original requesting client device to prevent the transferring of cookies from one device to another device. For instance, data identifying the client (e.g., user agent) can be cryptographically hashed and that hash value is stored in the cookie. On subsequent requests, the same data identifying the client (e.g., user agent) is hashed using the same cryptographic hash function and compared with the value included in the cookie. If the values are the same, then the cookie is verified. If the values are different, then the cookie is not verified. In some embodiments, the cookie is verified prior to assigning the user to a user bucket. In some embodiments, once a cookie is issued, the cookie is valid for a specific amount of time (e.g., 24 hours). An example cookie has the following format and fields:

reqCookie: {
    "bucketId": "Wed, 26 May 2021 19:51:00 GMT",
    "lastCheckInTime": "Wed, 26 May 2021 20:01:13 GMT",
    "acceptedAt": "Wed, 26 May 2021 20:01:13 GMT",="
  }

Where bucketID is the identifier for the user bucket (or cluster) that the request was assigned to, acceptedAt indicates the time when the user was accepted to the resource for the first time, and lastCheckInTime is the time when the user was last seen in the application queue for the resource. In some embodiments, each worker has a minimum check-in time. In some embodiments, a worker expects that each user will stay in their assigned user bucket in an application queue and give at least one check-in during that time. Using the lastCheckInTime of a cookie, the number of queued users can be tracked. In the example cookie above, the user first visited around Wed, 26 May 2021 9:51:00 GMT, waited for around 10 minutes before being accepted on Wed, 26 May 2021 20:01:13 GMT, and last checked in on Wed, 26 May 2021 20:01:13 GMT.

In an embodiment, after a user has been accepted to the application, the user may be eligible to stay accepted to the application for a period, even after leaving the application (e.g., even after closing their browser). The allowable reentry time may be customizable (e.g., by the operator or owner of the application) that allows the user to reenter the application without having to be re-queued. This time may be referred a the SessionDuration value. When a user is accepted to the application, the cookie may be set to expire SessionDuration value from the time the user was last seen (lastCheckInTime).

The exemplary networked system 100 may also include control server 140, which may be owned or operated by the service. The control server 140 may provide a set of tools and interfaces for a domain owner or operator to, among other things, configure the application queue settings. For example, one or more of the following may be configured for each application queue: a queue name; a queue description, a hostname, a pathname, a total number of active users (e.g., the target maximum number or threshold number of active sessions), a value of new users per minute (e.g., the new users per one minute that can be allowed to access the resource), and an amount of time that the user's cookie will be valid for the origin (e.g., in minutes). In some embodiments, the domain owner or operators can further configure additional customizations of the webpage document or GUI for the application queue, including customization of layouts, images, HTML and .css code, etc. For example, the webpage document for the application queue can be customized to visually match the layout and style of the requested resource such that there is no indication to a user that the user is in an application queue outside of a domain of the requested resource, or when access to the resource is granted, switching the display to the domain of the requested resource can be a seamless event without a visual changeover. In some embodiments, the webpage document or GUI for the application queue can be customized to include messages and/or media content for display to a user that can provide information regarding the requested resource, the application queue, etc.

The coordination of the state of the application queue may be managed in different ways in different embodiments. In an embodiment, the state is managed in a central and fixed location (e.g., a single database or single key-value store). In another embodiment, the state is managed with a durable object that is dynamically created for each application queue.

In a centralized embodiment, the control server 140 (or other centralized server) may periodically receive state information regarding the application queues from the edge servers 122A-N. For example, the state information from edge server 122A can include information indicating the number of requests received by the edge server 122A for the application, the current number of admitted users, and/or the current number of users waiting to be admitted. This information may be reported in the background and the control server 140 may aggregate this information in a data structure. The data structure can include a sorted list of the user bucket identifiers (e.g., bucketIds) in the application queue. The data structure can include a waiting field indicating how many users are waiting with a particular bucketId and an activeUsers field indicating the number of users active on the resource. In some embodiments, the control server 140 can be configured to determine, from the received state information, whether a threshold number of user sessions has been exceeded. In some embodiments, the control server 140 periodically sends state information for each of the data centers 125A-N such as the total number of active user sessions and/or the total number of users waiting. In an embodiment, if the control server 140 determines that the threshold number of user sessions has been exceeded, the control server 140 transmits an indication to the data centers 125A-N indicating that requests should be delayed from being sent to the origin server 130 and instead users should be assigned to a queue until requests can again be sent to the origin server 130 (e.g., when the number of requests being processed by the origin server 130 or the number of users with active sessions with the origin server 130 is below the threshold number). In some embodiments, the control server 140 can further send information indicating that the origin server 130 is able to accept a number of additional requests, information indicating that the origin server 130 is able to accept additional sessions from users currently in the application queues 124A-N, information indicating a number of requests that can be accepted from each of the edge servers 122A-N, etc. In response, the data centers 125A-N can select one or more of the users in application queues 124A-N of edge servers 122A-N that can initiate sessions with the origin server 130. In some embodiments, requests 155A-I associated with users selected from the application queues 124-N can be sent to the origin server 130. Requests 155A-I can be all of the requests 150A-M, or can be a greater or a fewer number of requests than requests 150A-M.

In an embodiment where the state is managed with a durable object, a worker may periodically send a message to a local durable object indicating how many users the worker assigned to the application queue and how many were allowed to initiate sessions with the origin server. In some embodiments, the durable object instance is created on the first request and remains active as long as it is receiving requests. The local durable object aggregates the counters sent by every worker (e.g., within a data center) to create a count of users assigned to the application queue and a count of users allowed to initiate sessions with the origin server, representing the state of the application queue. The local durable object can send information regarding an associated data center, including the number of users making requests or the number of workers in the data center. The local durable object can update a global durable object and receive information about other data centers as the response. The local durable object can then send this information to the workers. The worker can then write this information to the cache. In some embodiments, when the worker receives a new request, the worker determines whether there is an active application queue. If there is an active application queue, the worker determines the state of the application queue by accessing the cache, which has stored a recent copy of the state of the application queue.

Although the embodiment in FIG. 1 depicts a single origin server 130 and control server 140, other embodiments contemplate a greater number of origin servers, and/or control servers.

Figure 2:
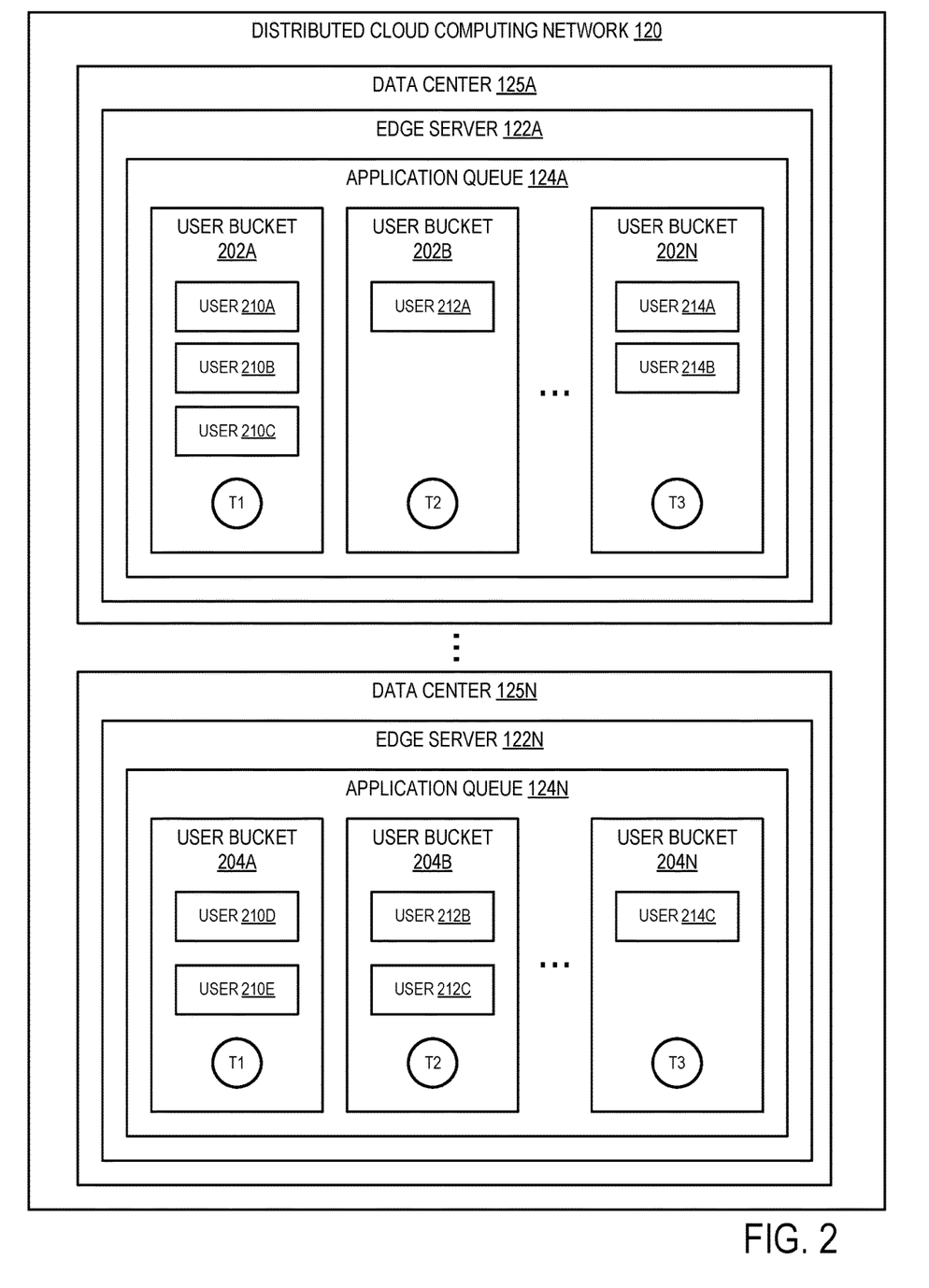
FIG. 2 illustrates an exemplary distributed cloud computing network application queuing system according to some embodiments described herein.

FIG. 2 illustrates an exemplary distributed cloud computing network application queuing system according to some embodiments described herein. The exemplary distributed cloud computing network of FIG. 2 can be a logical view or an abstraction of an implementation of the application queuing system. As illustrated in FIG. 2, distributed cloud computing network 120 includes data centers 125A-N that are geographically distributed. Data centers 125A-N include edge servers 122A-N. Edge server 122A includes application queue 124A and edge server 122N includes application queue 124N. Each application queue 124A-N can include one or more user buckets. For example, application queue 124A includes user buckets 202A-N and application queue 124N includes user buckets 204A-204N. In some embodiments, the application queues 124A and 124N are enabled in response to a request from a domain owner to enable a queue to handle network traffic or in response to an amount of network traffic exceeding a predefined limit (e.g., based on a domain owner-configured setting).

Each user bucket can correspond to a specific time interval. For example, user buckets 202A and 204A correspond to time interval T1, user buckets 202B and 204B correspond to time interval T2, and user buckets 202N and 20N correspond to time interval T3. Each time interval can be of a predefined length, e.g., 30 seconds, one minute, etc., and users are inserted into a user bucket based on when their requests are received. For example, assuming time interval T1 is from 12:01:00 A.M. to 12:01:59 A.M., requests from users 210A-E would have been received at edge servers 122A and 122N during that time interval. Each subsequent user bucket can be for a subsequent time interval. Continuing the example, time interval T2 is from 12:02:00 A.M. to 12:02:59 A.M. and includes users 212A-C, and time interval T3 is from 12:03:00 A.M. to 12:03:59 A.M., and includes users 214A-C, assigned based on the times of arrival of their requests at edge servers 122A and 122N. In some embodiments, as users are assigned to user buckets based on the times of arrival of their requests at the edge servers 122A-N, at any given time, an edge server only assigns new users in a single user bucket (e.g., the user bucket associated with a time interval that includes the current time).

In some embodiments, the edge server 122A does not create a user bucket for a time interval if the edge server 122A does not receive any requests during the time interval. In other embodiments, the edge server 122A automatically creates a user bucket for each time interval and removes created user buckets if there are no requests received during the specific time interval corresponding to the user bucket.

In some embodiments, when the application is ready to accept new user sessions, each of the edge servers 122A-N can be allocated user slots. In some embodiments, the number of user slots at a given time can be expressed as follows:

$$\text{User\_Slots} = \min(\text{new\_users\_per\_minute}, (\text{total\_active\_users} - \text{global\_concurrent\_users}))$$

Where new_users_per_minute is a value representing how many new users per minute are allowed to access the resource, total_active_users is the total number of active users that can be accessing the resource at any given time, and global_concurrent_users is the total number of users that have been given access to the resource. The values of new_users_per_minute, total_active_users, and global_concurrent_users can be obtained from the state information sent between the edge servers 122A-N and/or sent to the control server 140.

In some embodiments, the user slots can be distributed evenly among the data centers. For example, if there are 100 user slots and 20 data centers, each data center could be allocated five user slots. However, as the data centers 120 can be geographically distributed throughout the world, they can receive varying amounts of requests depending on their locations. This can result in some data centers having significantly more queued users than others. In some embodiments, to ensure a fair distribution of user slots when there are a plurality of data centers with varying amounts of network traffic, the historical amount of network traffic handled by each data center is considered. In such embodiments, each data center can be allocated a specific number of user slots based on the number of users queued and/or the number of users accepted to the application within a particular period of time (e.g., the previous two minutes, the previous five minutes, etc.). For example, assume that in a previous two minute time interval, data center 125A received 25% of all requests across all data centers 125A-N for the resource hosted by the origin server 130, data center 125N received 10% of all requests, and all other data centers of the data centers 125A-N received an equal amount of the requests. In some embodiments, each of the data centers 125A-N are allocated user slots proportional to the percentage of the total requests that were received by the data centers 125A-N, individually, within the previous time interval. Continuing the example, when the origin server 130 begins accepting the 100 new requests (e.g., to initiate sessions from users), the data center 125A can be allocated 25 user slots, the data center 125N can be allocated ten user slots, and the remaining user slots are allocated among the remaining data centers.

In some embodiments, each of data centers 125A-N randomly selects a plurality of queued users up to the allocated number of user slots. Each of data centers 125A-N can first select queued users from the first user bucket (e.g., the oldest user bucket storing users with the earliest arrival times) to accept to the application or resource. In some embodiments, if a data center runs out of queued users in the first user bucket, that user bucket can be discarded and the edge server can select additional queued users from the next oldest user bucket, and so on, until the edge server has used up their allocated user slots. Where a data center has multiple edge servers, each with their own application queue and user buckets, the data center can select queued users from all user buckets having the same earliest arrival times (e.g., any user buckets from any edge servers of a data center that are associated with time interval T1).

In other embodiments, the data centers 125A-N utilize a first-in, first-out (FIFO) implementation when determining the order in which queued users in a user bucket are selected.

In some embodiments, when a request is received, a worker is used to decide whether to send the request to the origin server or the user associated with the request queued in an application queue.

Figure 3:
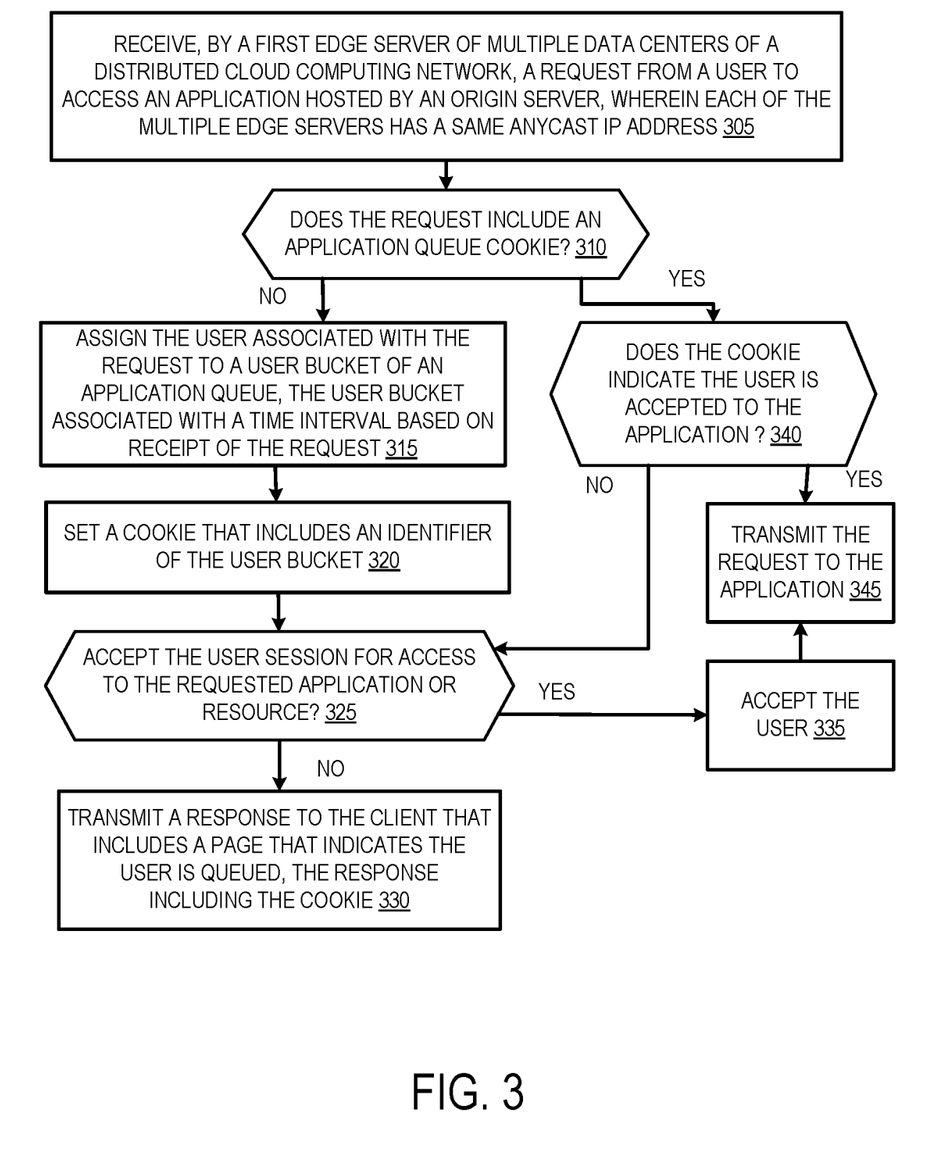
FIG. 3 is a flow diagram that illustrates exemplary operations for managing requests to access a resource hosted by an origin server using an application queue according to an embodiment.

FIG. 3 is a flow diagram that illustrates exemplary operations for managing requests to access a resource or application hosted by an origin server using a queuing system in a distributed cloud computing network according to an embodiment. The operations of FIG. 3 will be described with reference to the exemplary embodiment of FIGS. 1 and 2. However, the operations of FIG. 3 can be performed by embodiments other than those discussed with reference to FIGS. 1 and 2, and the embodiments discussed with reference to FIGS. 1 and 2 can perform operations different than those discussed with reference to FIG. 3. The operations of FIG. 3 are described as being performed by one or more edge servers (e.g., edge servers 122A-N) of a distributed cloud computing network (e.g., distributed cloud computing network 120).

At operation 305, a first edge server of multiple edge servers of a distributed cloud computing network receives a request from a client network device associated with a first user to access an application or resource hosted by an origin server. For example, the request may be to initiate a session to access a web application or modify the resource hosted by the origin server. Each of the multiple edge servers 122A-N can receive and process the request. In an embodiment, the particular edge server that receives the request is determined by the network infrastructure according to an Anycast implementation or by a geographical load balancer. For instance, the same anycast IP address may be advertised by each of the data centers 125A-N and the data center that is closest to the requesting client device in terms of routing protocol metrics will receive the request. Many such requests may be received at the same edge server or at different edge servers in different data centers at approximately the same time. In an embodiment, the request may be handled by a worker.

Next, at operation 310, the first edge server determines whether the request includes an application queue cookie. If it does not, then flow moves to operation 315. If the request includes an application queue cookie, the flow moves to operation 340. At operation 315 (the request does not include an application queue cookie), the first edge server assigns the first user associated with the request to a user bucket of an application queue. The user bucket is associated with a time interval based on receipt of the request. For example, if a user bucket is for requests received between 12:00:00 P.M. and 12:01:00 P.M., any users associated with requests that arrive during that time interval are assigned to the user bucket. In some embodiments, only a single user bucket is open for receiving requests at any given time. For example, given user buckets that each hold users associated with requests received within a particular one minute time interval, only a first user bucket for the current minute time interval can queue new users as they arrive. As new requests are received during the current minute time interval, users associated with the new requests are automatically queued in the first user bucket. After the current minute time interval is completed, the first user bucket is closed to new users and a second user bucket is generated to queue users associated with requests received in the next minute time interval. The receiving edge server may update the state associated with the application queue such as increasing the count of the number of user sessions that are waiting to be accepted to the application or resource.

In an embodiment, if the number of users in a particular bucket is over a threshold, that bucket may be split into smaller buckets so that no individual bucket is over the threshold. For example, if the threshold for the bucket size is 3000 and 5000 users were inserted into the same bucket, that bucket may be split into multiple buckets. The users may be assigned equally across the smaller buckets. For instance, the 5000 buckets may be split into two buckets each having 2500 users.

In an embodiment, if the number of users in a particular bucket is over a threshold, the bucket identifier includes a randomization of a portion of the timestamp. In an embodiment, a random float value is included in the cookie. In either case, the users with the lower random value or people toward the beginning of the bucket are allowed access to the application first.

Next, at operation 320, the receiving edge server sets an application queue cookie that includes an identifier of the user bucket to which the user is assigned. For instance, the identifier of the user bucket may be a date and time. This application queue cookie is expected to be sent by the client on subsequent requests. In an embodiment, the application queue cookie is verified prior to counting the user as being in their assigned bucket.

Next, at operation 325, the receiving edge server determines whether to accept the user session for access to the requested application or resource based at least on the position of the user bucket in the application queue and the number of eligible slots (if any). For instance, if there are 50 eligible user slots and there are 80 users in earlier user buckets, the user session will not be accepted. If there are 50 eligible user slots and there are 20 users in the user's bucket (and no earlier user bucket), then all 20 users are accepted to the application or resource. If there are not enough eligible user slots for a particular bucket (e.g., there are 20 eligible user slots but 60 users waiting in the same bucket), the edge server may randomly select the users for acceptance to the application or resource in an embodiment. Also, if there are not enough eligible user slots for a particular user bucket across data centers, each data center may be allocated a share of the eligible slots based on the ratio of past traffic to decide how many users each data center can accept. For instance, if a first data center has received roughly 25% of the traffic and a second data center has received roughly 75% of the traffic in a past time period (e.g., the last 2 minutes of traffic), the first data center will be allocated 25% of the eligible user slots and the second data center will be allocated 75% of the eligible user slots. Using the example above, if there are 20 eligible user slots, the first data center is allocated 5 user slots and the second data center is allocated 15 user slots.

If the edge server determines to accept the user session for access to the requested application or resource, flow moves from operation 325 to operation 335 where the user is accepted. The application queue cookie may be updated (e.g., the accepted at value may be set, the user last seen value may be updated). The counter indicating the accepted user may be increased. Flow moves from operation 335 to operation 345 where the request is transmitted to the origin server hosting the application. A response may be received from the origin and transmitted to the requesting client device.

If the edge server determines not to accept the user session for access to the requested application or resource, the edge server will delay accepting the user to the web application. Flow moves from operation 325 to operation 330. At operation 330, the receiving edge server transmits a response to the client that includes a page that indicates the user is queued. The response also includes the application queue cookie set for the user. The page may indicate that the user is queued and may provide their estimated wait time. The page may be configured to automatically refresh (e.g., once every 10 seconds) and transmit the cookie to the edge server, until the user is accepted to the resource or application. To configure the page to be automatically refreshed, a refresh header may be included in the page (e.g., a meta http-equiv refresh tag). Alternatively, a client-side script (e.g., JavaScript) may be referenced or embedded in the page to control the refreshing of the website. Such a client-side script may be configured to periodically check with the edge server to determine whether to refresh the page.

The estimated wait time can be determined by the receiving edge server and be based on the number of users in the application queue ahead of the queued user and the average number of user sessions accepted to the application per minute. The number of users ahead of the instant users divided by the average number of users accepted to the application per minute provides the estimated wait time. As the page is refreshed, the estimated time can be updated. The operations end at operation 330 until a subsequent request from the first user is received which in case operations start back at operation 305.

Referring back to operation 310, if the request includes an application queue cookie, then flow moves to operation 340. At operation 340, the receiving edge server determines whether the application queue cookie indicates that the user session is accepted to the application or resource. The receiving edge server accesses the information in the application queue cookie to determine if the user has already been accepted to the application queue and if the user is still eligible to access the requested resource or application. For instance, if the cookie indicates that the user was accepted (e.g., the acceptedAt field is set and provides the time the user was accepted to the resource) and the cookie has not expired, the user is still eligible to be accepted to the application. In an embodiment, the domain owner or operator can configure how long a user session lasts. For when a user is accepted to access a resource or application, the application queue cookie may be set to expire a configurable value of minutes from the time when the user was last seen (e.g., as indicated in the application queue cookie). If the user session is accepted to the application, then flow moves to operation 345 where the request is transmitted to the origin. A response may be received from the origin and transmitted to the requesting client device. The application queue cookie may be updated (e.g., the user last seen value may be updated).

In some embodiments, a worker can select a number of queued users up to the number of allocated user slots for the data center to send to the origin server at approximately the same time. In other embodiments, the worker can stagger the release of queued users to the origin server over a period of time. For example, if a data center is allocated four request slots, the worker can stagger the selection and sending of four queued users to the origin server over a period of time (e.g., 30 seconds, one minute, etc.). In such embodiments, staggering the queued users to the origin server can prevent spikes in the amount of traffic being sent to the origin server.

In some embodiments, in addition to providing the requested resource to the requesting client devices, the multiple edge servers can further store the requested resource. For example, upon receiving a response with the requested resource, edge server 122A can store the resource in a cache associated with the edge server 122A for later access.

Figure 4:
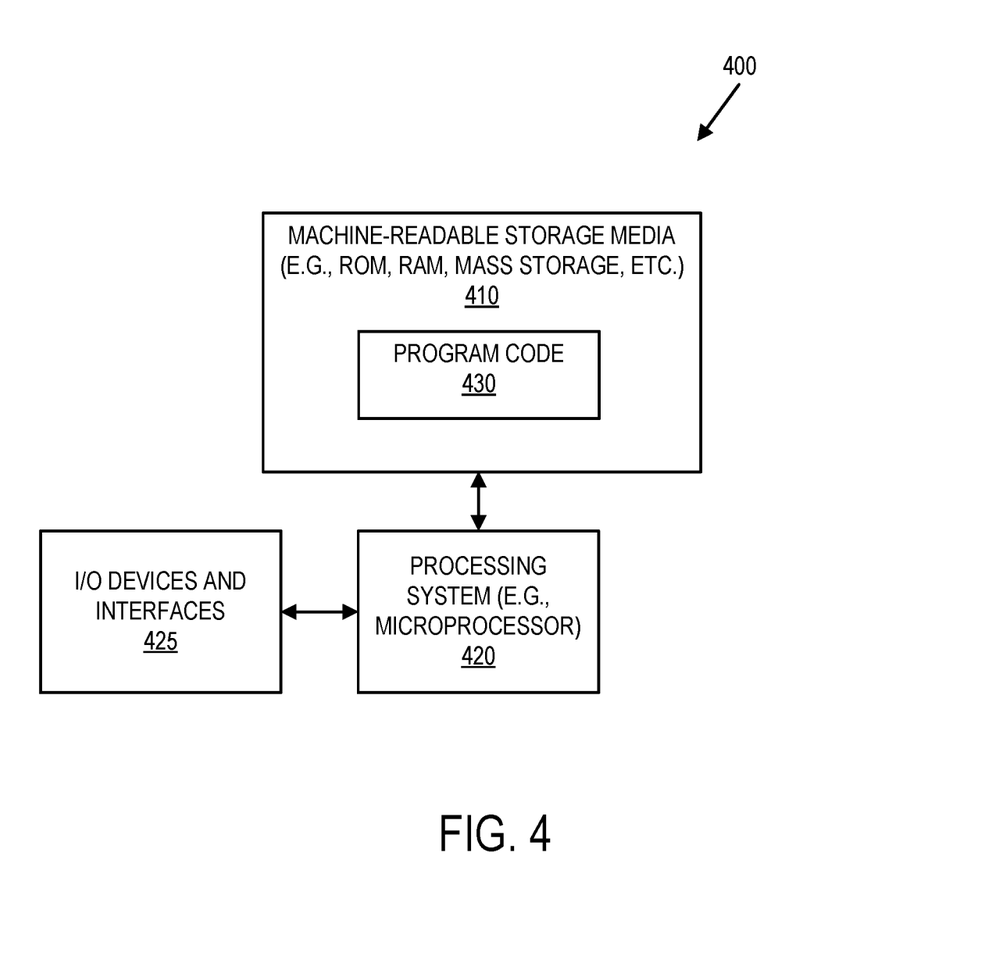
FIG. 4 illustrates a block diagram for an exemplary data processing system that may be used in some embodiments.

FIG. 4 illustrates a block diagram for an exemplary data processing system 400 that may be used in some embodiments. Data processing system 400 includes one or more processors 420 and connected system components (e.g., multiple connected chips). One or more such data processing systems 400 may be utilized to implement the embodiments and operations described with respect to the edge servers, origin server, control server, or other electronic devices.

The data processing system 400 is an electronic device which stores and transmits (internally and/or with other electronic devices over a network) code (which is composed of software instructions and which is sometimes referred to as computer program code or a computer program) and/or data using machine-readable media (also called computer-readable media), such as machine-readable storage media 410 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processor(s) 420. For example, the depicted machine-readable storage media 410 may store program code 430 that, when executed by the processor(s) 420, causes the data processing system 400 to perform the operations described herein.

The data processing system 400 also includes one or more input or output ("I/O") devices and interfaces 425, which are provided to allow a user to provide input to, receive output from, and otherwise transfer data to and from the system. These I/O devices 425 may include a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. The I/O devices and interfaces 425 may include wireless transceivers, such as an IEEE 802.11 transceiver, an infrared transceiver, a Bluetooth transceiver, a wireless cellular telephony transceiver (e.g., 2G, 3G, 4G, 5G), an NFC transceiver, or another wireless protocol to connect the data processing system 400 with another device, external component, or a network and receive stored instructions, data, tokens, etc. For instance, a wired or wireless transceiver may transmit and receive messages to and from the edge server as described herein.

Additional components, not shown, may also be part of the system 400, and, in certain embodiments, fewer components than that shown in FIG. 4 may also be used in a data processing system 400. One or more buses may be used to interconnect the various components shown in FIG. 4.

Thus, an electronic device (e.g., a computer or a mobile client device) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the preceding description and the claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method comprising:
receiving, at a first edge server of a plurality of edge servers of a first data center of a plurality of data centers of a distributed cloud computing network, a first request from a first user to access a web application hosted at an origin server, wherein each of the plurality of edge servers of the plurality of data centers share a same anycast IP address;
determining to delay accepting the first user to the web application;
responsive to the determining to delay accepting the first user to the web application, performing the following:
assigning the first user to a first user bucket of a queue, wherein the first user bucket is associated with a time interval, wherein an arrival time of the first request at the first edge server is within the time interval, wherein the first user is one of a plurality of users assigned to the first user bucket, and wherein the first user bucket is one of a plurality of user buckets of the queue, and
transmitting a response to the first user that includes a page that indicates that the first user is queued, wherein the response also includes a first cookie that identifies the first user bucket, and wherein the page is configured to automatically refresh;
receiving, at the first edge server, a second request from the first user to access the web application, the second request including the first cookie that identifies the first user bucket, and wherein the second request is received as a result of the page automatically refreshing;
determining, based on at least a position of the first user bucket out of the plurality of user buckets of the queue and a number of slots eligible for access to the web application, to accept the first user to the web application; and
responsive to the determining to accept the first user to the web application, performing the following:
transmitting a third request to access the web application to the origin server,
receiving a first response to the third request from the origin server, and
transmitting the first response to the first user.

2. The method of claim 1, further comprising:
determining, by the first edge server, an estimated wait time associated with the first user based on a number of users ahead of the first user in the queue and an average number of user sessions accepted to the web application per minute.

3. The method of claim 2, wherein the page includes the estimated wait time associated with the first user for accepting the first user to the web application.

4. The method of claim 1, further comprising:
updating the first cookie to indicate that the first user is accepted to the web application and transmitting the updated first cookie to the first user;
receiving, at the first edge server, a fourth request from the first user to access the web application, wherein the fourth request includes the first cookie;
determining that the first cookie has not expired, and responsive to this determination, performing the following:
transmitting a fifth request to access the web application to the origin server,
receiving a second response to the fifth request from the origin server, and
transmitting the second response to the first user.

5. The method of claim 1, further comprising:
updating the first cookie to include data that indicates a time in which the first user last requested access to the application; and
setting the first cookie to expire at a configurable re-entry time value from the time in which the first user last requested access to the application.

6. The method of claim 1, further comprising:
receiving, at a second edge server of the plurality of edge servers of a second one of the plurality of data centers of the distributed cloud computing network, a second request from a second user to access the web application hosted at the origin server;
wherein the request includes a second cookie that identifies the first user bucket;
determining, based on at least the position of the first user bucket out of the plurality of user buckets of the queue and the number of slots eligible for access to the web application, to accept the second user to the web application, wherein the first user and the second user are accepted as part of the same first user bucket; and
responsive to the determining to accept the second user to the web application, performing the following:
transmitting a fourth request to access the web application to the origin server,
receiving a second response to the fourth request from the origin server, and
transmitting the second response to the second user.

7. The method of claim 1, wherein the number of slots eligible for access to the web application at the first data center is different than a number of slots eligible for access to the web application at a second data center of the plurality of data centers, wherein an allocation of slots is based on a history of past traffic for the web application.

8. A method, comprising:
receiving, at a plurality of edge servers of a plurality of data centers of a distributed cloud computing network, a plurality of requests from a plurality of users to access a web application hosted at an origin server, wherein each of the plurality of edge servers share a same anycast IP address;
determining that a limit on a number of users accessing the web application exceeds a threshold number, and responsive to this determination, delaying sending requests for users not currently accepted for accessing the web application including:
assigning each of the plurality of users associated with the plurality of requests to a user bucket of a queue, the user bucket associated with a time interval, wherein an arrival time of the requests being within the time interval;
transmitting a plurality of pages to the plurality of users respectively, wherein each page indicates the corresponding user is queued and provides an estimated wait time, and wherein each page is configured to automatically refresh;
periodically receiving requests from the plurality of users that are in a queued state in the user bucket of the queue for the web application;
responsive to determining that there are user slots available for the web application, allowing at least some of the users to access the web application, including:
sending requests for those users to the origin server,
receiving responding responses from the origin server, and
transmitting the responses to the users.

9. The method of claim 8, further comprising:
allocating a number of user slots for the web application at each of the plurality of data centers based on historic traffic patterns.

10. The method of claim 8, further comprising:
transmitting cookies to the plurality of users that identifies that the plurality of users are in the user bucket of the queue.

11. The method of claim 8, further comprising:
determining the estimated wait time for the plurality of users based on a number of users ahead of the plurality of users in the queue and an average number of user sessions accepted to the web application per minute.

12. A first edge server of a distributed cloud computing network, comprising:
a processor; and
a non-transitory machine-readable storage medium that provides instructions that, when executed by the edge server, cause the first edge server to perform operations comprising:
receiving, at the first edge server of a plurality of edge servers of a first data center of a plurality of data centers of the distributed cloud computing network, a first request from a first user to access a web application hosted at an origin server, wherein each of the plurality of edge servers of the plurality of data centers share a same anycast IP address;
determining to delay accepting the first user to the web application;
responsive to the determining to delay accepting the first user to the web application, performing the following:
assigning the first user to a first user bucket of a queue, wherein the first user bucket is associated with a time interval, wherein an arrival time of the first request at the first edge server is within the time interval, wherein the first user is one of a plurality of users assigned to the first user bucket, and wherein the first user bucket is one of a plurality of user buckets of the queue, and
transmitting a response to the first user that includes a page that indicates that the first user is queued, wherein the response also includes a first cookie that identifies the first user bucket, and wherein the page is configured to automatically refresh;
receiving, at the first edge server, a second request from the first user to access the web application, the second request including the first cookie that identifies the first user bucket, and wherein the second request is received as a result of the page automatically refreshing;
determining, based on at least a position of the first user bucket out of the plurality of user buckets of the queue and a number of slots eligible for access to the web application, to accept the first user to the web application; and
responsive to the determining to accept the first user to the web application, performing the following:
transmitting a third request to access the web application to the origin server,
receiving a first response to the third request from the origin server, and
transmitting the first response to the first user.

13. The first edge server of claim 12, wherein the operations further comprise:
determining, by the first edge server, an estimated wait time associated with the first user based on a number of users ahead of the first user in the queue and an average number of user sessions accepted to the web application per minute.

14. The first edge server of claim 13, wherein the page includes the estimated wait time associated with the first user for accepting the first user to the web application.

15. The first edge server of claim 12, wherein the operations further comprise:
updating the first cookie to indicate that the first user is accepted to the web application and transmitting the updated first cookie to the first user;
receiving, at the first edge server, a fourth request from the first user to access the web application, wherein the fourth request includes the first cookie;
determining that the first cookie has not expired, and responsive to this determination, performing the following:
transmitting a fifth request to access the web application to the origin server,
receiving a second response to the fifth request from the origin server, and
transmitting the second response to the first user.

16. The first edge server of claim 12, wherein the operations further comprise:
updating the first cookie to include data that indicates a time in which the first user last requested access to the application; and
setting the first cookie to expire at a configurable re-entry time value from the time in which the first user last requested access to the application.

17. The first edge server of claim 12, wherein the operations further comprise:
receiving, at a second edge server of the plurality of edge servers of a second one of the plurality of data centers of the distributed cloud computing network, a second request from a second user to access the web application hosted at the origin server;
wherein the request includes a second cookie that identifies the first user bucket;
determining, based on at least the position of the first user bucket out of the plurality of user buckets of the queue and the number of slots eligible for access to the web application, to accept the second user to the web application, wherein the first user and the second user are accepted as part of the same first user bucket; and
responsive to the determining to accept the second user to the web application, performing the following:
transmitting a fourth request to access the web application to the origin server,
receiving a second response to the fourth request from the origin server, and
transmitting the second response to the second user.

* * * * *